Oct. 11, 1932.  E. C. HEAD  1,882,008
HOB
Filed Nov. 28, 1928  2 Sheets-Sheet 1

INVENTOR.
Ernest C. Head
BY
ATTORNEY

Patented Oct. 11, 1932

1,882,008

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

HOB

Application filed November 28, 1928. Serial No. 322,498.

The present invention relates to the hobbing of tapered gears and especially to the hobbing of longitudinally curved tooth tapered gears.

Longitudinally curved tooth tapered gears as hobbed according to previously existing hobbing methods have lacked adjustment in mesh because by previous methods of hobbing, the two members of a pair were provided with tooth surfaces which matched each other along their whole length with the consequence that the gears had a full length bearing or tooth surface contact in mesh. Such gears had, therefore, to be very accurately and very rigidly mounted. In their lack of adjustment, hobbed spiral bevel gears have differed unfavorably from spiral bevel gears produced according to other existing cutting methods which are sufficiently flexible to permit of cutting the mating tooth surfaces of a pair of gears so that the tooth bearing or contact can be localized at any point along the mating tooth surfaces, thereby enabling the gears to accommodate themselves to the unavoidable inaccuracies of mounting and to the displacements under load which occur in commercial installations.

The purpose of the present invention is to provide a hob which may be employed in cutting a tapered gear and particularly a longitudinally curved tooth taper gear so that its tooth surfaces will mismatch the mating tooth surfaces of a mating gear when the two gears are in mesh whereby a tooth bearing may be obtained between the two gears which will extend along a portion of the length of the mating tooth surfaces only, disappearing toward the ends of the teeth. With the present invention, therefore, tapered gears can be hobbed which can be more readily assembled and which are more dependable under the conditions which actually exist during operation than tapered gears hobbed according to any previously known process.

The present invention consists first, in the novel construction of the hob; second in the method in which this hob is employed to produce gears; third in the method by which the hob is manufactured; and fourth in the apparatus by which this last named method may be carried out. The claims of the present application are confined, however, to the hob. The method of cutting gears and the method and apparatus by which the hob is manufactured form the subject matter of other applications.

Figure 4:
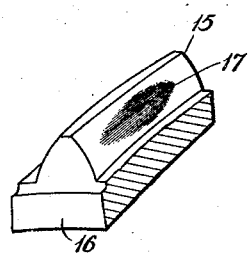
Figure 3:
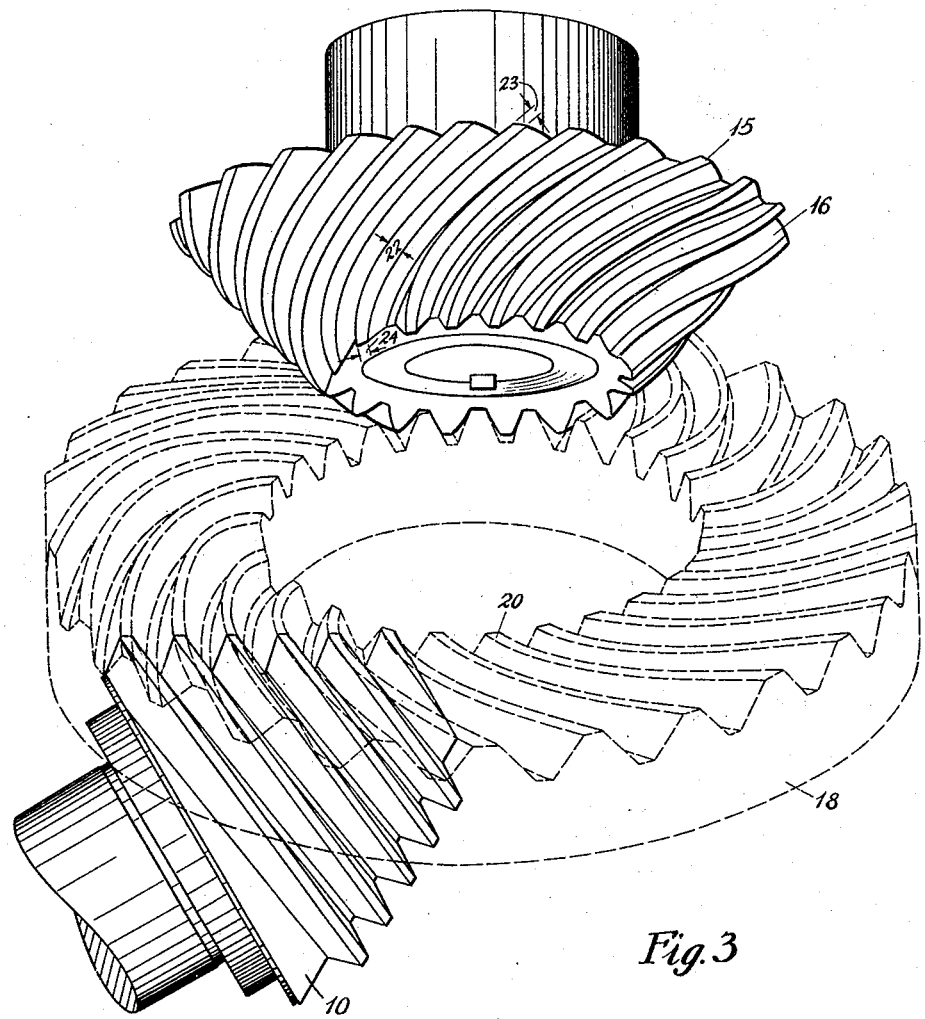

Figure 3 is a diagrammatic view illustrating the theory on which the manufacture of a longitudinally curved tooth gear by the hob of the present invention is based and illustrating, further, a preferred method of producing longitudinally curved tooth gears according to this invention; and Figure 4 is a side elevation of a tooth of a spiral bevel gear produced according to this invention showing how the tooth bearing may be localized through the present invention.

In producing longitudinally curved tooth gears according to the present invention, a hob is employed having teeth the thickness of which varies from standard or normal thickness in such wise that their thickness increases over the standard thickness from a point midway the length of the hob toward both ends thereof. In a hob of constant pitch, this means that the teeth will be thinner midway the length of the hob than at its ends. By positioning a hob constructed according to this invention diagonally of a taper gear blank, then, tooth spaces will be cut in the blank which are of normal or standard width midway their length but of greater than standard width at their ends. Conversely, the teeth of the gear will be of normal thickness midway their length with gradually decreasing thickness toward both ends. When a gear cut in this way is meshed with another gear cut by the same process or by customary practice, it is obvious that the mating tooth surfaces of the two gears will bear or contact midway of their length but be out of contact at their ends. The bearing or tooth surface contact will be, in other words, localized. In generating gears with this invention, the hob, of course, represents a basic gear having teeth thinner at their centers than at their outer and inner ends and rolls with the blank to produce teeth on the blank conjugate to those of the basic gear which teeth will be, as already described, thicker in their center than at their ends.

The present invention may be applied to hobs of either variable or constant pitch, whether cylindrical or tapered, in fact, to any form of hob for cutting longitudinally curved tooth tapered gears. In the following specification and in the accompanying drawings, this invention is illustrated in connection with a taper hob of the form more particularly described in my copending application No. 278,208, filed May 16, 1928. This hob has teeth, the pressure angle of the cutting edges of which varies from one end of the hob to the other. With such a hob, gears having tooth spaces and teeth of properly tapering depth from their outer to their inner ends can be cut. In one aspect, then, the present invention may be considered as an improvement over the invention of the prior application above mentioned inasmuch as in addition to providing a hob which will cut teeth and tooth spaces of properly tapering depth it will provide a hob which will also produce gears which in mesh with mating gears will run with a localized bearing.

Reference may now be had to the drawings for a more complete understanding of my invention. 10 indicates a taper hob constructed according to one embodiment of this invention. The cutting teeth 11 of the hob are arranged upon a conical surface in a continuous thread or helix. 12 designates the axis of the hob and 13 an element of a conical surface coaxial with the hob. This conical surface is, for instance, the pitch surface of the hob when operating on a gear blank. On this operating pitch surface of which the line 13 is an element, the thicknesses of the cutting teeth of the hob vary from the standard or normal thicknesses which the teeth of the hob would have on this operating pitch surface were the hob of any usual heretofore known construction. In the preferred form of hob of my invention, the variation from standard tooth thickness measured on the pitch surface increases from a point intermediate the length of the hob toward both ends of the hob.

The hob 10 shown is a modification of the usual form of taper hob of constant pitch through the incorporation in its structure of the principles of the present invention. In taper hobs of constant pitch as constructed prior to the invention of my application No. 278,208 above mentioned, the thickness of the hob teeth was constant in the plane of measurement along an element of any conical surface coaxial with the hob, whether the tip surface, the pitch surface, or the root surface of the hob or any intermediate conical surface. In hobs constructed according to the invention of my application mentioned, the thickness of the hob teeth remains constant on the pitch surface or on any one selected conical surface although on all other conical surfaces of the hob the thickness of the teeth varies from one end of the hob to the other due to the change in pressure angle of the cutting edges of the hob teeth from one end of the hob to the other. With the present invention, whether the hob embodies in its construction the principles of my prior invention above mentioned or be of a structure known prior thereto, the thickness of the teeth of the hob will vary on the operating pitch surface or on any other conical surface coaxial with the hob. So, for a hob of constant pitch as modified in structure by my invention, the tooth thickness measured on the operating pitch surface or on any conical surface coaxial with the hob will increase toward both ends of the hob measured from a point intermediate the length of the hob. So in the hob 10 shown, the teeth $11^a$ and $11^b$, which may be considered as equi-distant from a point midway the length of the hob, will be of equal thickness $t$ measured on the operating pitch surface 13 of the hob but the thickness $t'$ of the teeth $11^c$ and $11^d$ which are further removed toward the ends of the hob from a point midway the length of the hob will be greater than the thickness $t$ of the teeth $11^a$ and $11^b$ measured on this same operating pitch surface. The thickness $t''$ of the teeth $11^e$ and $11^f$ measured on the operating pitch surface 13 will be in turn greater than the thickness $t'$ of the teeth $11^c$ and $11^d$.

The purpose underlying the structural features of my hob so far described will be clear when reference is had to Figure 3 of the drawings. In cutting a bevel gear with the hob of the present invention, the hob is positioned so that it extends diagonally of the face of the blank. Through this arrangement, the cutting teeth which are disposed centrally of the length of the hob, such as the teeth $11^a$ and $11^b$ will cut parts of the tooth spaces of the gear blank intermediate the length of such spaces while the teeth at the two ends of the hob will cut the outer and inner ends, respectively, of the tooth spaces of the gear blank. In this way, tooth spaces will be cut on the blank which are of less width at points intermediate their length than at their outer and inner ends. The teeth of the gear cut by the hob, then, will be of greater thickness at points intermediate their length than at their outer and inner ends. When a gear so cut is run with a mating gear cut in a similar manner or according to the usual heretofore known practise, the mating tooth surfaces will bear or have contact only in the central portions of their length and a bearing or tooth surface contact will be obtained, as desired, of the character shown in Figure 4, where 15 indicates the tooth of a longitudinally curved tooth gear 16 cut according to this invention and 17 designates the bearing or tooth surface contact obtained when this gear 16 runs with the tooth of a mating gear.

Figure 3 illustrates the application of this invention to the generation of a longitudinally curved tooth bevel gear. 10 again designates the hob. For the sake of clearness in illustration, the cutting teeth are not shown but the hob is shown in the form of a worm, that is, as it would appear before it is gashed and relieved. The hob 10 is, of course, positioned so as to represent the teeth of the basic gear to which the gear 16 to be cut is to be generated conjugate.

The basic gear represented by the hob 10 is shown in dotted lines at 18 and as illustrated is a true crown gear having longitudinally curved teeth 20. Because of the structure of the hob 10, the teeth 20 of this imaginary basic crown gear 18 must be considered as being of greater thickness measured on the pitch surface of the crown gear at the ends of the teeth than at points intermediate the ends. The relative motions employed in generating the bevel gear 16 are the same as those which have been employed in heretofore known practise, namely, a relative rolling motion is produced between the gear blank 16 and the hob 10 as though the gear blank 16 were rolling on the crown gear 18 represented by the hob. This rolling motion usually comprises a rotation of the gear blank on its axis and a simultaneous relative movement between the hob and gear blank about the axis of the imaginary basic generating gear 18. During the rolling motion the hob and blank are rotated continuously on their respective axes in intermeshing engagement as in any usual hobbing process.

Through this relative rolling motion between hob and blank, teeth are generated on the blank 16 which are conjugate to the teeth of the imaginary basic generating gear 18. These teeth 15 of the gear 16 will, consequently, be wider at points 22 intermediate their ends than at points 23 and 24 at the ends of the teeth. The gear 16 when run with a mating gear will, consequently, have a localized bearing as illustrated in and as already described with reference to Figure 4.

The variation in tooth thickness required in a hob constructed according to this invention may be readily obtained by a proper feeding movement of the relieving tool during the operation of relieving the hob teeth. This feed movement of the relieving tool should be a movement of the tool inwardly of the hob as the relieving tool moves from one end of the hob to the center of the hob and then outwardly as the relieving tool moves from the center to the other end of the hob. The required feed movement of the relieving tool can be obtained simply by swinging the relieving tool on a circular arc as it moves from one end of the hob to the other.

Figure 1:
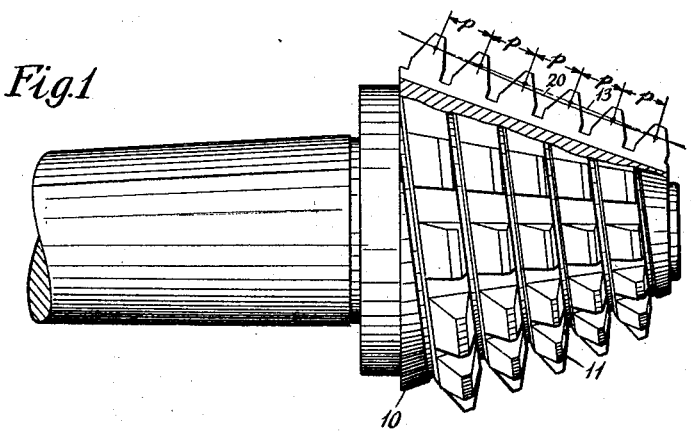
Figure 1 is a side elevation, partly in section, of a taper hob constructed according to one embodiment of this invention.
Figure 2:
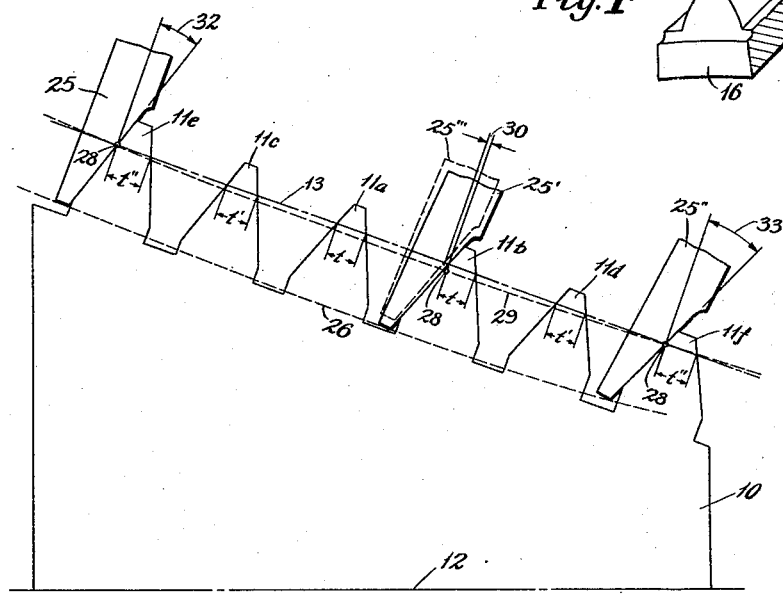
Figure 2 is a diagrammatic view showing a preferred method of relieving this hob.

This preferred method of relieving the hob is illustrated diagrammatically in Figure 2. The relieving tool is designated at 25. Three positions of this relieving tool 25 in the operation of relieving one side surface of the teeth 11 of the hob are shown, 25, 25' and 25'', respectively. In the usual process of relieving a hob, the hob blank is rotated on its axis, a relative relieving movement is produced between the relieving tool and hob blank and simultaneously a relative movement is produced between the relieving tool and hob blank longitudinally of the hob blank. In addition, as above described, with the present invention a relative feed movement is produced between the hob blank and the relieving tool during the last named longitudinal movement and in the preferred form, this feed movement constitutes a movement of the relieving tool in a circular arc. In this feed movement, the tip of the relieving tool will move on a circular arc such as the arc 26 shown in Figure 2 and any point 28 on the side surface of the tool will move on a parallel circular arc 29. The point 28 may operate on the operating pitch line 13 during relief of the side surfaces of the teeth 11e and 11f but will operate on points below the operating pitch surface 13 and on the arc 29 for teeth intermediate the teeth 11e and 11f. The heavy line position 25' of the relieving tool indicates the position which the tool assumes when relieving the side surface of the tooth 11b according to this invention while the dotted line position 25''' is the position which the relieving tool would have were no feeding motion employed. It will be seen that the tool has moved inwardly at 25' from the position 25''' and the thickness of the tooth 11b will be decreased by the amount indicated by the arrows at 30 through the relieving operation on this one side alone of this tooth 11b. The relieving of the hob is illustrated during operation upon one side of the hob teeth only. It will be understood that the opposite sides of the hob teeth are relieved in a similar manner to the operation just described. Where the relieving tool is swung in a circular arc as described, the hob teeth will be no longer of constant thickness on the operating cone surface 13. They will, however, be of uniform thickness measured on the circular arc 29. Where the hob is produced by gashing and relieving a worm which has a thread of uniform lead, although the thickness of the teeth changes, the lead of the hob will still remain uniform measured on the pitch line 13. Thus the distances $p$ (Figure 1) from the center of one tooth to the center of another measured on the line 13 are equal.

As already indicated, the drawings show an application of the present invention to the form of hob described in my copending application No. 278,208. In this hob, the pressure angle of the side faces of the hob teeth changes from front to rear of the teeth and the pressure angles of the cutting edges of the hob teeth increase from one end of the hob to the other. Thus in the hob shown, the pressure angle 32 of the cutting edge of the tooth 11$e$ at one end of the hob is less than the pressure angle 33 of the corresponding cutting edge of the tooth 11$f$ at the other end of the hob and the pressure angle of the teeth of the hob intermediate these two end teeth increases from the large end toward the small end in correspondence with the respective positions of these teeth in the hob thread. It is greater, for instance, for the cutting edge of the tooth 11$b$ than for the corresponding cutting edge of the tooth 11$e$ and less than the corresponding cutting edge of the tooth 11$f$. In this hob, the thickness of the hob teeth is uniform on the line 29, but on any parallel arc there is a variation from absolute uniformity of thickness due to the tilting motion of the relieving tool in forming the sides of the hob teeth with changing pressure angles from one end of the hob to the other. The change in pressure angle of the cutting edges and cutting faces from front to rear of the teeth may be produced in the manner more particularly described in my copending application above referred to by tilting the relieving tool 25 as it moves from one end of the hob to the other during the relieving operation.

While the invention has been described with reference to a taper hob, it is to be understood, also, that it is applicable to cylindrical hobs and that the hobs, whether cylindrical or tapered, may be of a structure modified by the variation in tooth thickness from a hob having a variable lead, as well as to hobs, the structure of which is a modification on a hob of constant lead through the provision of the features of this invention as herein described. The invention is not only applicable to hobs for generating gears, but may be employed, also, in cutting tapered gears without a generating roll. It is pointed out, moreover, that wherever the term "tapered" is employed as applied to gears, it is intended to include not only bevel and hypoid gears but crown gears as well or gears which might mesh with said crown gears, since a crown gear is a gear having a pitch cone angle of 90°.

In general, it may be said that while I have described my invention in connection with certain specific embodiments it will be understood that this invention is capable of various further modifications without departing from the scope of the invention and that this application is intended to cover any adaptations, uses, or variations of my invention following, in general, the principles of the invention and including such departures from the present disclosure as come within known or customary practise in the art and as may be applied to the essential features hereinbefore set forth and as fall within the scope of the invention or the limits of the appended claims.

Having thus described my invention, what I claim is:

1. A hob having a plurality of finishing teeth arranged in a thread of a single pitch, said pitch conforming to a definite law, each of said teeth having two finishing side cutting edges for cutting opposite sides of the teeth of a gear, and certain of said teeth, when measured on a surface of revolution coaxial with the hob, varying in thickness from the normal thickness of corresponding teeth of a thread of the selected pitch.

2. A hob having a plurality of finishing teeth arranged in a thread of a single pitch, said pitch conforming to a definite law, each of said teeth having two finishing side cutting edges for cutting opposite sides of the teeth of a gear, and said teeth being of increasing thickness measured from a point intermediate the length of the hob toward both ends of the hob.

3. A taper hob having a plurality of finishing teeth arranged in a thread of a single pitch, said pitch conforming to a definite law, each of said teeth having two finishing side cutting edges for cutting opposite sides of the teeth of the gear, and certain of said teeth, when measured on a surface of revolution coaxial with the hob, varying in thickness from the normal thickness of corresponding teeth of a thread of the selected pitch.

4. A taper hob having a plurality of finishing teeth arranged in a thread of a single pitch, said pitch conforming to a definite law, each of said teeth having two finishing side cutting edges for cutting opposite sides of the teeth of a gear and said teeth being of increased thickness measured from a point intermediate the ends of the hob toward both ends of the hob.

5. A taper hob having a plurality of finishing teeth arranged in a continuous thread, each of said teeth having two finishing side cutting edges, said teeth being of increasing thickness measured from the center toward both ends of the hob.

6. A hob having a plurality of finishing teeth arranged in a thread of a single, constant pitch and a plurality of convolutions, the teeth midway the length of the hob being thinner than the teeth at the ends of the hob.

7. A hob having a plurality of cutting teeth arranged in a helix of a given pitch and a plurality of convolutions, corresponding side cutting edges of which are of constantly varying pressure angle from one end to the other of the hob, the thickness of said teeth varying in changing amounts, from a point intermediate the length of the hob toward both ends thereof, from the normal thickness of the teeth determined by their respective positions along the helix.

8. A taper hob having a plurality of cutting teeth arranged in a helix of a given pitch and a plurality of convolutions, corresponding side cutting edges of which are of constantly varying pressure angle from one end to the other of the hob, the thickness of said teeth varying in changing amounts, from a point intermediate the length of the hob toward both ends thereof, from the normal thickness of the teeth determined by their respective positions along the helix.

9. A taper hob having a plurality of cutting teeth arranged in a thread, the thickness of said teeth being uniform measured on a circular arc and changing from the center toward both ends of the hob measured on an element of a cone surface coaxial with the hob.

10. A hob having a plurality of finishing teeth arranged in a continuous thread, said teeth being of constant thickness measured lengthwise of the hob on a circular arc.

11. A taper hob having a plurality of finishing teeth arranged in a continuous thread, said teeth being of constant thickness measured lengthwise of the hob on a circular arc.

12. A hob having a plurality of finishing teeth arranged in a continuous thread of uniform lead, said teeth being of uniform thickness measured lengthwise of the hob on a circular arc but of varying thickness measured on an element of a surface coaxial of the hob.

13. A hob having a plurality of finishing teeth arranged in a continuous thread of uniform lead, said teeth being of uniform thickness measured lengthwise of the hob on a circular arc and the side cutting edges of said teeth being of constantly varying pressure angle from one end of the hob to the other.

14. A taper hob having a plurality of finishing teeth arranged in a continuous thread of uniform lead, said teeth being of uniform thickness measured lengthwise of the hob along a circular arc and the side cutting edges of said teeth being of constantly varying pressure angle from one end of the hob to the other.

15. A taper hob having a plurality of finishing teeth arranged in a thread of a plurality of convolutions, said teeth being of increasing thickness along a surface of revolution coaxial with the hob measured from a point intermediate the length of the hob toward both ends of the hob.

16. A hob having its teeth arranged in a thread of predetermined lead, said teeth varying in thickness measured along an element of a surface coaxial with the hob from the normal thickness of the teeth as determined by their position in the thread and being of normal thickness measured lengthwise of the hob on a circular arc.

17. A taper hob having its teeth arranged in a thread of a predetermined lead, said teeth varying in thickness from their normal thickness as determined by their position in the thread, from a point intermediate the length of the hob to both ends thereof when measured along a cone element of the hob, and being of normal thickness measured lengthwise of the hob on a circular arc.

18. A hob having a plurality of finishing teeth arranged in a thread of a plurality of convolutions but of a single pitch, said teeth being of increasing thickness measured from the center toward both ends of the hob.

19. A hob having a plurality of finishing teeth arranged in a thread of a plurality of convolutions but of a single, uniform pitch, said teeth being of non-uniform thickness along the length of the hob.

20. A taper hob having a plurality of finishing teeth arranged in a thread of a plurality of convolutions but of a single, uniform pitch, said teeth being of non-uniform thickness along the length of the hob.

21. A hob having a plurality of finishing teeth arranged in a continuous thread of a plurality of convolutions, each of said finishing teeth having two finishing side-cutting edges, said teeth increasing in thickness toward both ends of the hob when measured along a surface of revolution coaxial with the hob.

22. A taper hob having a plurality of finishing teeth arranged in a continuous thread of constant lead and of a plurality of convolutions, said teeth being of increased thickness from a point intermediate the length of the hob toward both ends thereof when measured along a conical surface coaxial with the hob, and each of said teeth having two finishing side-cutting edges.

23. A hob having a plurality of cutting teeth arranged in a thread of a plurality of convolutions which is of constant pitch from the center of one tooth to another measured along the pitch surface of the hob, said teeth being of varying thickness along said surface.

24. A taper hob having a plurality of cutting teeth arranged in a thread of a plurality of convolutions which is of constant pitch from the center of one tooth to another measured along the pitch surface of the hob, said teeth being of varying thickness along said surface.

25. A hob having a plurality of cutting teeth arranged in a thread of a plurality of convolutions which is of constant pitch along the pitch surface of the hob, said teeth being of varying thickness measured along said surface and having side cutting edges of changing pressure angle from one end of the hob to the other.

26. A taper hob having a plurality of cutting teeth arranged in a thread of a plurality of convolutions which is of constant pitch along the pitch surface of the hob, said teeth being of varying thickness measured along said surface and having side cutting edges of changing pressure angle from one end of the hob to the other.

ERNEST C. HEAD.